US012774692B2

(12) United States Patent
Guerrato et al.

(10) Patent No.: US 12,774,692 B2
(45) Date of Patent: Oct. 27, 2026

(54) FUEL SYSTEM FOR A POWER PLANT

(71) Applicant: PHINIA DELPHI LUXEMBOURG SARL, Belvaux (LU)

(72) Inventors: Diego Guerrato, Gillingham (GB); Neil Wilson, Rochester (GB)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 155 days.

(21) Appl. No.: 18/685,894

(22) PCT Filed: Aug. 23, 2022

(86) PCT No.: PCT/EP2022/073521
§ 371 (c)(1),
(2) Date: Feb. 22, 2024

(87) PCT Pub. No.: WO2023/025823
PCT Pub. Date: Mar. 2, 2023

(65) Prior Publication Data
US 2024/0352908 A1 Oct. 24, 2024

(30) Foreign Application Priority Data
Aug. 23, 2021 (GB) ..................................... 2112068

(51) Int. Cl.
*F02M 21/02* (2006.01)
*F17C 5/02* (2006.01)
*F17C 5/06* (2006.01)

(52) U.S. Cl.
CPC ...... *F02M 21/023* (2013.01); *F02M 21/0206* (2013.01); *F02M 21/0224* (2013.01);
(Continued)

(58) Field of Classification Search
CPC .............. F02M 21/023; F02M 21/0206; F17C 2201/0185; F17C 5/06
See application file for complete search history.

(56) References Cited

U.S. PATENT DOCUMENTS 3,947,744 A * 3/1976 Grace ........................ H02J 7/14 320/DIG. 34
5,454,408 A * 10/1995 DiBella ................. F04B 9/1176 141/47

(Continued)

FOREIGN PATENT DOCUMENTS

EP 1722152 A2 11/2006
EP 2201282 A1 6/2010

(Continued)

OTHER PUBLICATIONS

International Search Report for PCT/EP2022/073521 dated Dec. 5, 2022, 3 pages.

*Primary Examiner* — Nicole Gardner
(74) *Attorney, Agent, or Firm* — WARNER NORCROSS + JUDD LLP

(57) ABSTRACT

A fuel system for supplying gaseous fuel to a power plant comprises a tank array comprising at least a first tank and a second tank configured to receive pressurised gaseous fuel for supply to the power plant, in use, from a filling station; a source of auxiliary control fluid for supplying auxiliary control fluid to the tank array when the fuel system is disconnected from the filling station; and a pump for pressurising auxiliary control fluid to be supplied to the tank array when control fluid flows through the pump in a forward direction. The fuel system also includes an energy store and a valve arrangement which is operable to control the supply of auxiliary control fluid to the tank array so as to control the discharge of the gaseous fuel from the tank array.

6 Claims, 8 Drawing Sheets

(52) U.S. Cl.
CPC ........... *F02M 21/0245* (2013.01); *F17C 5/02* (2013.01); *F17C 5/06* (2013.01)

(56) References Cited

U.S. PATENT DOCUMENTS

| | | | | | |
|---|---|---|---|---|---|
| 5,603,360 | A * | 2/1997 | Teel | F17C 9/00 | 137/267 |
| 12,392,308 | B2 * | 8/2025 | Fernandez-Oxby | F02M 21/0221 | |
| 2002/0068929 | A1 * | 6/2002 | Zvuloni | A61B 18/02 | 606/22 |
| 2010/0139777 | A1 * | 6/2010 | Whiteman | F17C 5/007 | 137/255 |
| 2010/0163135 | A1 * | 7/2010 | Safronovs | F17C 5/06 | 141/71 |
| 2014/0091574 | A1 * | 4/2014 | Favy | F02C 6/16 | 137/209 |
| 2015/0362124 | A1 * | 12/2015 | Favy | F02C 6/16 | 206/0.6 |
| 2018/0119882 | A1 * | 5/2018 | Allidieres | F17C 13/025 | |

FOREIGN PATENT DOCUMENTS

| | | | |
|---|---|---|---|
| WO | 2009035311 | A1 | 3/2009 |
| WO | 2013056295 | A1 | 4/2013 |

* cited by examiner

FUEL SYSTEM FOR A POWER PLANT

CROSS-REFERENCE TO RELATED APPLICATIONS

This application is the U.S. National Stage of International Application No. PCT/EP2022/073521 filed on 23 Aug. 2022, which claims priority to and all advantages of United Kingdom Application No. 2112068.8 filed on 23 Aug. 2021, the contents of which are incorporated herein by reference.

FIELD OF THE INVENTION

This invention relates to a fuel system for supplying gaseous fuel to a gaseous-fueled power plant. In particular, but not exclusively, the invention relates to a fuel system which uses hydrogen as the source of fuel to be supplied to a power plant in the form of an internal combustion engine. The internal combustion engine may form a part of a gas-fueled vehicle.

BACKGROUND

There is an increasing drive in modern technology areas to move away from fossil fuels as a source of energy and to replace them with renewable energy sources. One notable development in recent years has been the development of electric vehicles where the fuel tank of the traditional internal combustion engine is replaced with a battery. However, current electric vehicle technologies have not achieved an energy density from the battery which is comparable with that achieved using traditional fuels (e.g. gasoline, diesel). Furthermore, such systems are limited with their range of travel which does not suit all user requirements, and for heavy duty applications where the size of the battery is impractical.

One alternative to these systems is to use a traditional internal combustion engine (ICE) but running on ecologically produced hydrogen gas. Such systems have been proposed in the art, but there are various efficiency concerns over those solutions and commercially viable options for such "hydrogen ICE" systems remain a challenge. One problem is that, for system efficiency, the hydrogen needs to be injected at pressures considerably higher than atmospheric pressure, which poses technical challenges for existing tank and injector designs.

Other gaseous fuels are also known for use in generating motive power, including compressed natural gas (CNG). Fuel cell technology, which relies on the ionisation of hydrogen within an electrolyte to generate electricity, is also well known for use in vehicles. Both systems require a source of gaseous fuel to generate motive power for the vehicle.

It is against this background that the invention has been devised.

STATEMENTS OF INVENTION

According to the present invention, there is provided a fuel system for supplying gaseous fuel to a power plant, the fuel system comprising a tank array comprising at least a first tank and a second tank configured to receive pressurised gaseous fuel for supply to the power plant, in use; a source of auxiliary control fluid for supply to the tank array when the fuel system is disconnected from the filling station, and a pump for pressurising auxiliary fluid supplied to the tank array when control fluid flows through the pump in a forward direction, and an energy store. A valve arrangement is operable to control the supply of auxiliary control fluid to the tank array so as to control the discharge of the gaseous fuel from the tank array, the valve arrangement being further operable to enable a reverse direction of flow of auxiliary control fluid from the tank array to enable a reverse direction of flow of auxiliary control fluid from the tank array through the pump when the fuel system is connected to a filling station, in use, to generate energy from the pump to store in the energy store.

The invention provides the advantage that energy harnessed from the filling phase can be recovered to an energy store (such as a battery) for later use, either in driving the pump for pressurising the auxiliary fluid or for other uses in the plant. The system therefore provides efficiency and running cost benefits.

The valve arrangement may include, for each tank of the array, an inlet one-way valve which is operable to control the supply of auxiliary control fluid to the associated tank and an outlet one-way valve which is operable to control the supply of auxiliary control fluid from the associated tank to the source of auxiliary control fluid.

The valve arrangement may further comprises an additional valve which is operable to close the source of auxiliary control fluid to allow auxiliary fluid within one of the first and second tanks to be returned in the reverse direction through the pump to the other of the first and second tanks, bypassing the source.

The valve arrangement may include, for each tank of the array, a fuel inlet one-way valve which is operable to control the supply of gaseous fuel to the tank array.

The valve arrangement may be operable by means of an electronic control unit (ECU).

The invention is particularly applicable for use in engines for vehicles, so that the power plant may be an internal combustion engine of a vehicle.

The gaseous fuel may be hydrogen.

According to a second aspect of the invention, there is provides a method for supplying gaseous fuel to a power plant, the fuel system comprising receiving pressurised gaseous fuel from a filling station in a tank array when the fuel system is connected with the filling station; pressurising auxiliary control fluid from a source of auxiliary control fluid by a pump when the auxiliary control fluid flows through the pump in a forward direction; supplying pressurised auxiliary control fluid to the tank array, when the fuel system is disconnected from the filling station, so as to discharge gaseous fuel from the tank array to the power plant; and enabling, under the control of a valve arrangement, a reverse direction of flow of auxiliary control fluid from the tank array through the pump when the fuel system is connected to the filling station so as to generate energy from the pump for storage within an energy store.

The fuel system may include an inlet one-way valve configured to control the flow of control fluid to an associated tank of the tank array, and an associated inlet valve configured to control the supply of gaseous fuel from the filling station to the associated tank, the method comprising operating the inlet one-way valve for control fluid prior to operating the inlet valves for gaseous fuel from the filling station when it is required to return control fluid in the reverse direction through the pump.

Operating the inlet one-way valves prior to the inlet valves from the filling station helps to reduce the effects of cavitation at the valve seats.

It will be appreciated that the various features of the first aspect of the invention are equally applicable to, alone or in appropriate combination, the second aspect of the invention also.

BRIEF DESCRIPTION OF THE DRAWINGS

The above and other aspects of the invention will now be described, by way of example only, with reference to the accompanying drawings, in which.

SPECIFIC DESCRIPTION

Figure 1:
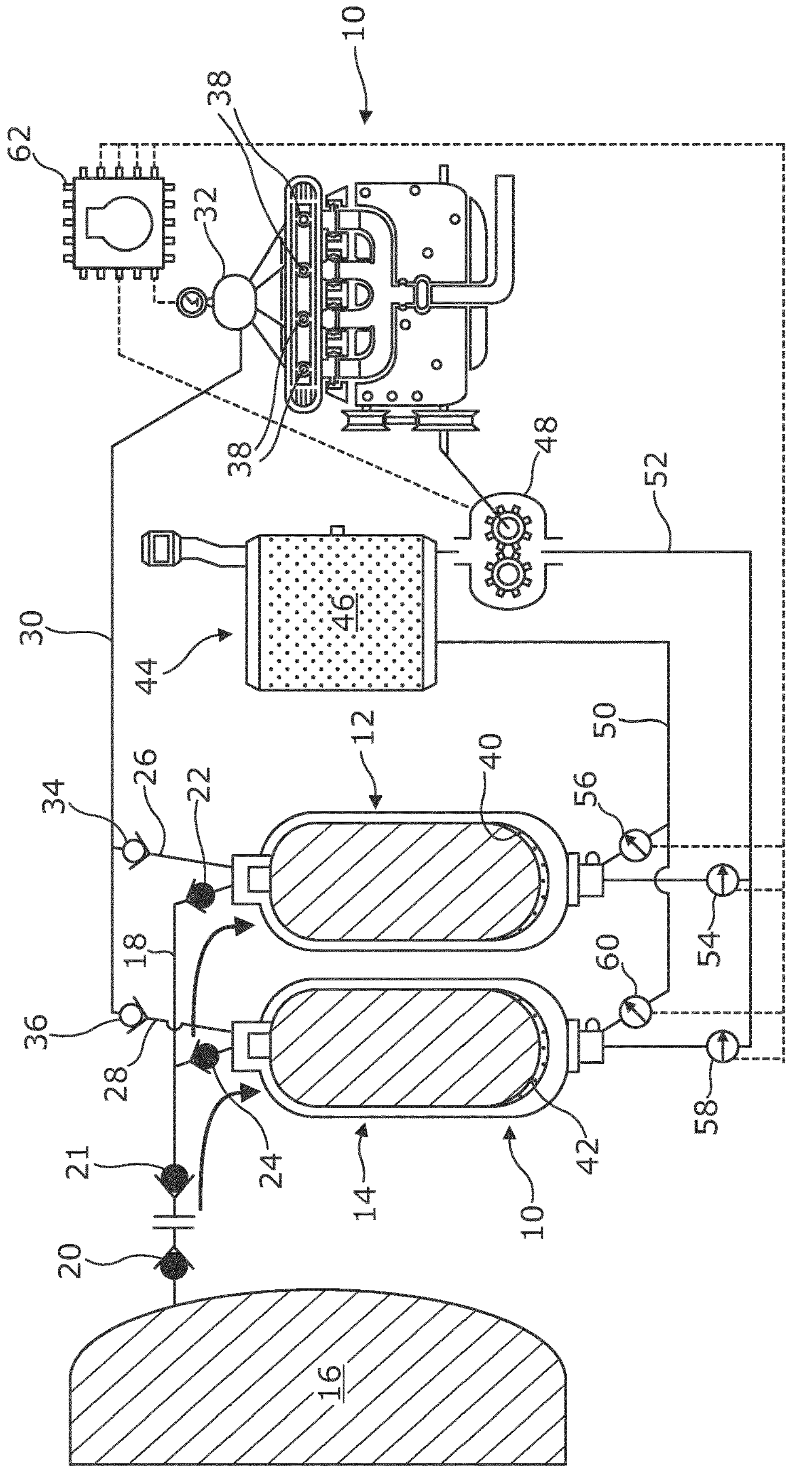
FIG. 1 is a schematic illustration of a fuel system with which the method of the invention may be used.

The present invention relates to the use of pressurised gaseous fuel to generate power within a power plant, such as an engine. One specific example of such a fuel system is shown in FIG. 1 which shows a fuel system for use in supplying pressurised hydrogen gas to an internal combustion engine, referred to generally as 10, of a vehicle.

The fuel system includes a tank array including at least a first tank 12. In the embodiment shown, the fuel system includes at least a first tank 12 and a second tank 14 configured to receive gaseous hydrogen from a supply tank 16 at a refueling station. The first tank 12 is connected via a supply line 18 to the supply tank 16 and the second tank 14 is connected via the supply line 18 to the supply tank 16. The supply tank 16 has a supply non-return valve 20 which is operable to open only when a fuel system is connected to the supply tank 16 for refilling. The supply line 18 is also provided with a supply inlet non-return valve 21 which ensures the system (i.e. the supply line 18) remains closed when it is detached from the supply tank 16 at the refueling station.

The supply line 18 from the supply tank 16 has two branches, one into the first tank 12 and one into the second tank 14. The branch to the first tank 12 is provided with a first tank inlet non-return valve 22 which is operable to control the pressure of gas within the first tank 12 when the supply tank 16 is connected to the first tank 12. When the pressure of hydrogen gas within the supply tank 16 exceeds that within the first tank 12, the first tank inlet non-return valve 22 is caused to open to allow hydrogen gas to flow into the first tank 12. The first tank inlet non-return valve 22 closes when the pressure of hydrogen gas within the first tank 12 equalises with that of the supply tank 16 and the first tank 12 is full. Likewise, the branch to the second tank 14 is provided with a second tank inlet non-return valve 24 which is operable to control the pressure of gas within the second tank 14. When the pressure of hydrogen gas within the supply tank 16 exceeds that within the second tank 14, the second tank inlet non-return valve 24 is caused to open to allow hydrogen gas to flow into the second tank 14. The second tank inlet non-return valve 24 closes when the pressure of hydrogen gas within the second tank 14 equalises with that of the supply tank 16 and the second tank 14 is full.

In FIG. 1, both the first tank 12 and the second tank 14 are full of hydrogen gas at the end of the system filling phase.

Each of the first and second tanks 12, 14 is also provided with a respective outlet line, 26, 28, which connects the respective tank to a supply line 30 for a fuel rail 32 for receiving pressurised hydrogen gas from the tanks 12, 14. An outlet non-return valve 34, 36, respectively, is provided for each tank within the associated outlet line 26, 28. A first tank outlet non-return valve 34 is associated with the first tank 12 and a second tank outlet non-return 36 valve is associated with the second tank 14. The outlet non-return valves 34, 36 are operable to open when the pressure of hydrogen gas in the associated tank 12, 14 exceeds the pressure of hydrogen gas within the common outlet line 30 (and hence the fuel rail 32) but they prevent the return flow of pressurised hydrogen gas from the fuel rail 32 to the first and second tanks 12, 14.

Typically, the hydrogen gas that is supplied from the supply tank at the refueling station is pressurised to a level of either 350 bar or 700 bar, or at a level between these two levels.

The fuel rail 32 is configured to deliver gaseous hydrogen to a plurality of fuel injectors 38 of the fuel system. In the embodiment shown the fuel system includes four injectors, each corresponding to a respective cylinder (not shown) of the engine. The injectors inject the hydrogen fuel at an injection pressure $P_i$, which is typically less than the storage pressure $P_s$.

Each of the first and second tanks 12, 14 is identical internally and includes a separation member in the form of a movable membrane, referred to as the first and second tank membranes 40, 42. Considering the first tank 12, a first tank membrane 40 is movable depending on the presence of an auxiliary control fluid that is supplied to the first tank 12 via an auxiliary control fluid delivery system, referred to generally as 44. Likewise, a second tank membrane 42 is associated with the second tank 14 and is movable depending on the presence of an auxiliary fluid supplied to the second tank 14 by the auxiliary control fluid delivery system 44.

The auxiliary control fluid delivery system includes an auxiliary supply tank (referred to as the auxiliary tank 46) containing an auxiliary control fluid such as liquid oil, pressurising means in the form of a pump 48, an auxiliary control fluid pipeline (comprising an auxiliary control fluid supply line 52 and an auxiliary control fluid return line 50) and a valve arrangement for controlling the supply of auxiliary fluid to the tank array 12, 14. The auxiliary control fluid is considered to be a control fluid, for reasons that will become clear from the following description.

The pump 48 is located in the auxiliary control fluid supply line 52 and both the auxiliary control fluid supply 52 and return 50 lines are in fluid communication with a sole inlet/outlet port of the auxiliary tank 46. The pump 48 is driven by a crank or shaft whose motion is coupled to that of a corresponding crank or shaft of the internal combustion engine. In other embodiments, the pump 48 may be electrically driven, or driven through a separate shaft which is not shared with the engine.

The valve arrangement includes four valves, two of which 54, 56 are associated with the first tank 12 and two of which 58, 60 are associated with the second tank 14. For the first tank 12, a first inlet one-way valve 54 controls the supply of auxiliary control fluid between the auxiliary tank 46 and the first tank 12 along the auxiliary control fluid supply line 52 and a first outlet one-way valve 56 controls the return flow of auxiliary fluid from the first tank 12 to the auxiliary tank 46 along the auxiliary control fluid return line 50. Likewise, for the second tank 14, a second inlet one-way valve 58 controls the supply of auxiliary control fluid between the auxiliary tank 46 and the second tank 14 along the auxiliary control fluid supply line 52 and a second outlet one-way valve 60 controls the return flow of auxiliary fluid from the second tank 14 to the auxiliary tank 46 along the auxiliary fluid return line 50. By way of example, the auxiliary control fluid may take the form of oil.

The four valves 54, 56, 58, 60 of the valve arrangement are controlled by means of an electronic control unit (ECU) 62, as indicated by the electrical connections shown in dashed lines. Likewise, the ECU 62 controls the pump 48 which pressurises the auxiliary control fluid for supply to the first and second tanks 12, 14, as further illustrated by the electrical connections shown in dashed lines.

In the configuration shown in FIG. 1, the first and second tanks 12, 14 have just been re-filled at the refueling station such that both the first and second tanks 12, 14 are full of hydrogen gas. In each of the fuel tanks 12, 14, the gas is separated from the oil by the associated membrane 40, 42 which is movable within the associated tank depending on the quantity of oil supplied to the tank from the auxiliary tank 46.

The method of operation of the fuel system will now be described with reference to FIGS. 2 to 6.

Figure 2:
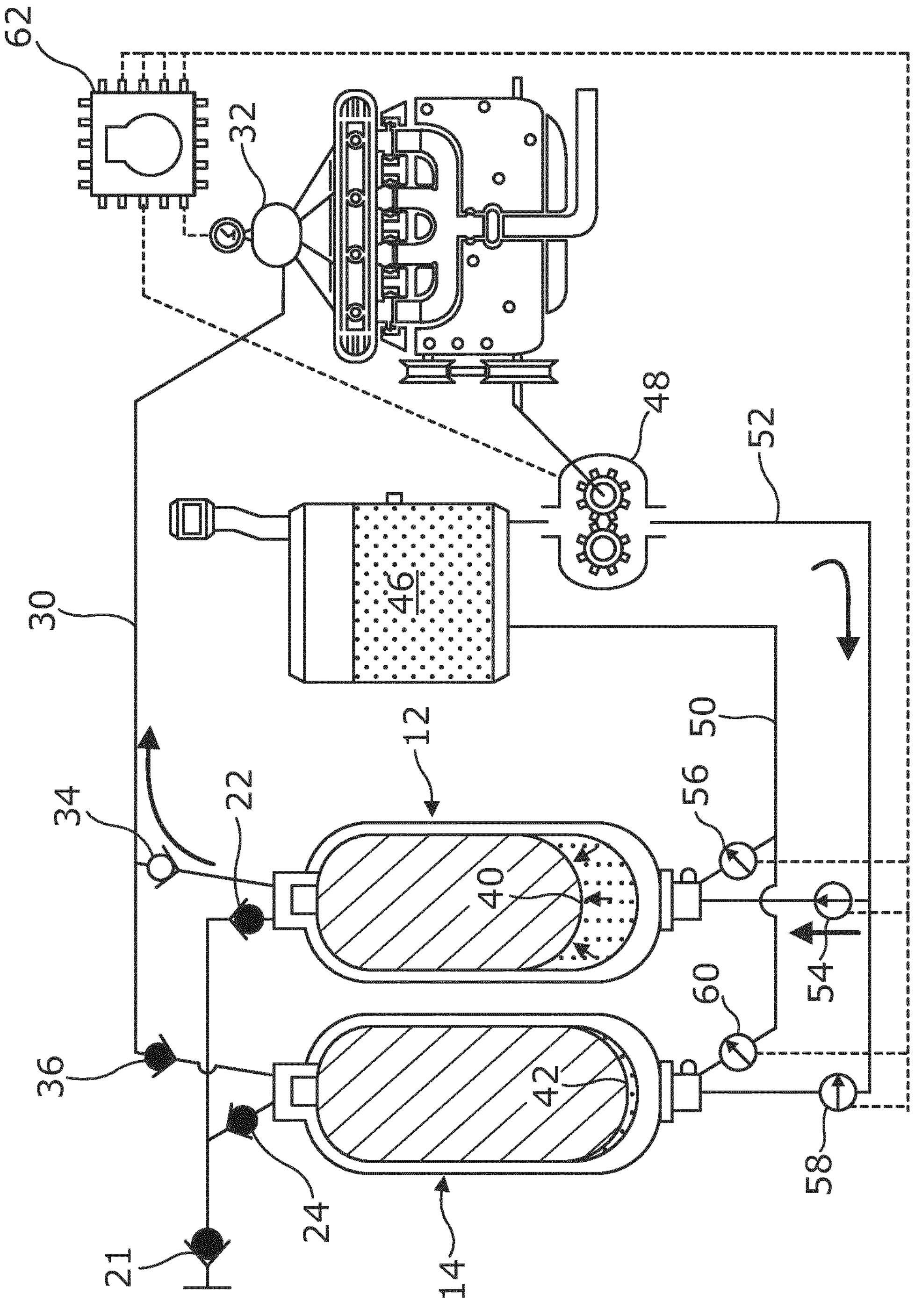
FIGS. 2 to 6 are schematic illustrations of the fuel system in FIG. 1 to illustrate various method steps of operation of the fuel system.

FIG. 2 shows the fuel system having been detached from the re-fueling system.

Initially, hydrogen gas can be supplied to the injectors without the intervention of the auxiliary control fluid delivery system, since the pressure of hydrogen gas in the first and second tanks and the common outlet line and fuel rail exceeds the injection pressure $P_i$. As fuel is supplied to the injectors from the fuel rail, the pressure of hydrogen gas in the fuel rail and common outlet line decreases. This causes the first and second tank outlet non-return valves to open to allow the pressure of hydrogen to equalise between the first and second tanks and the common outlet line and fuel rail. Eventually, as more hydrogen gas is supplied from the first and second tanks, the pressure in the first and second tanks and in the common outlet line and the fuel rail decreases to match the injection pressure $P_i$. At this point, the injectors cannot be supplied with hydrogen gas without the assistance of the auxiliary control fluid delivery system.

In FIG. 2, the fuel system has been detached from the re-fueling system (supply tank 16) and the first tank 12 is filling the fuel rail 32 with pressurised hydrogen gas via the first tank outlet non-return valve 34. The second tank 14 is in a "waiting phase", now full with pressurised hydrogen gas, and with the second tank outlet non-return valve 36 closed so that hydrogen gas cannot escape the second tank 14. The supply inlet non-return valve 21 is closed (as the system is detached from the filling station) and the first and second tank inlet non-return valves 22, 24 are also closed.

The first inlet one-way valve 54 of the first tank 12 is opened by the ECU 62 so that oil within the auxiliary tank 46 is able to flow, via the pump 48, into the first tank 12. As a result of the incoming oil flow, the first tank membrane 40 is displaced upwardly (in the illustration shown), reducing the volume of the available space for hydrogen gas and causing the pressure of the hydrogen gas within the tank 12 to increase above the pressure of the hydrogen gas in the common outlet line and the fuel rail. As a result, the first tank outlet non return valve 34 in the outlet line 26 is caused to open to discharge hydrogen gas from the first tank 12 into the common outlet line 30 to the fuel rail 32. This is described as the "delivery phase" for the first tank 12 as hydrogen gas is delivered into the fuel rail 32 and enables the supply of hydrogen gas to the injectors once the pressure in the tank array, the common outlet line and the fuel rail has reached the injection pressure, $P_i$. In FIG. 2 it can be seen that the oil is starting to empty from the auxiliary tank 46 during this phase, displacing the hydrogen gas from the first tank 12 to the fuel rail 32.

While the first tank is in the delivery phase, the second tank is in a "waiting phase", still full with pressurised hydrogen gas at the injection pressure $P_i$. The non-return aspect of the second tank outlet non-return valve prevents the hydrogen in the common outlet line entering the second tank, despite being at a higher pressure than the hydrogen in the second tank. The supply inlet non-return valve is closed (as the system is detached from the filling station) and the first and second tank inlet non-return valves are also closed.

Figure 3:
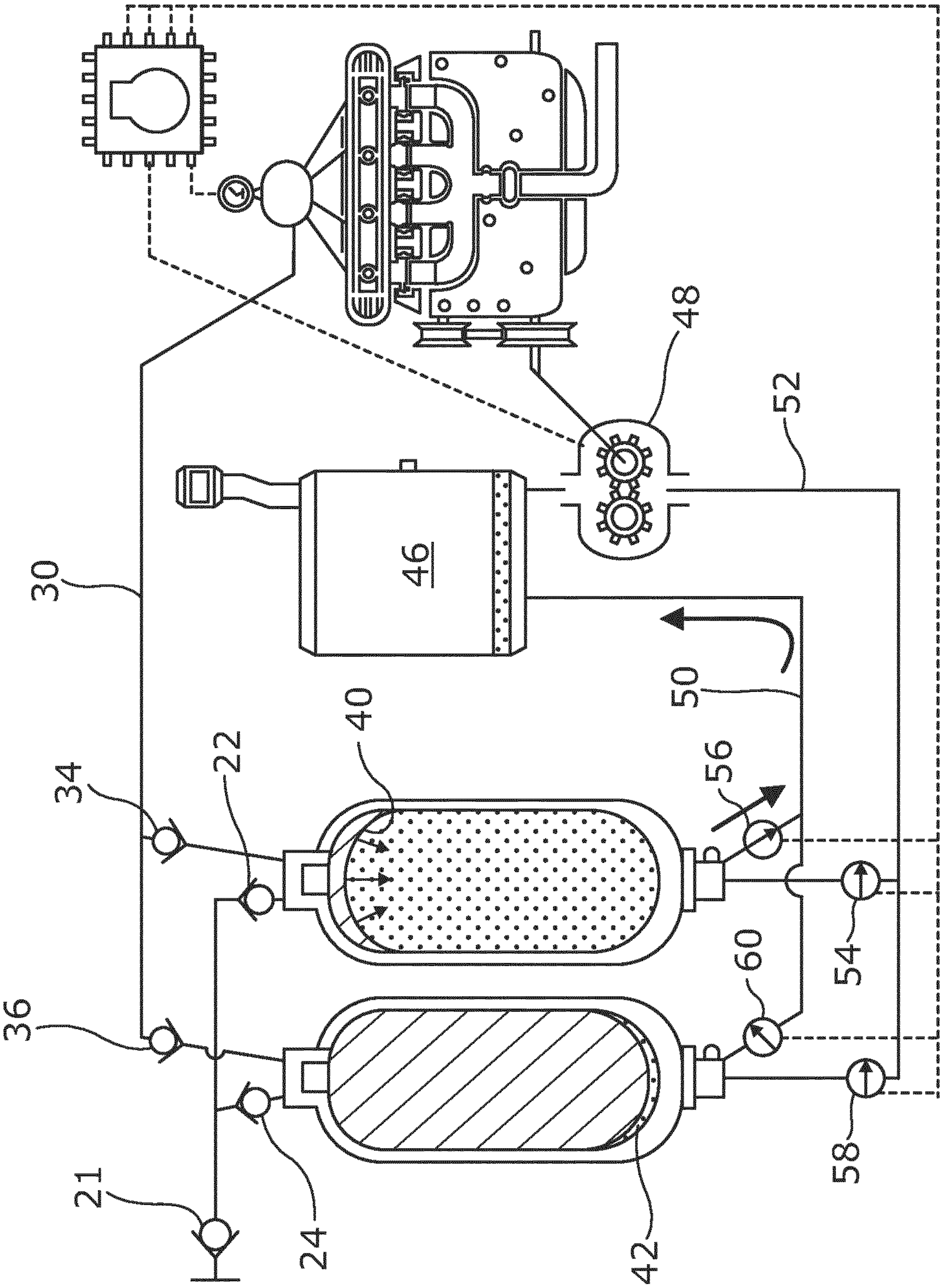

Referring to FIG. 3, the first tank 12 has been depleted of hydrogen gas and is near fully-filled with oil. The first tank 12 then enters an "oil discharge phase" during which the first inlet one-way valve 54 to the first tank is closed by the ECU 62 to prevent the further supply of oil through the auxiliary control fluid inlet line 52 to the first tank 12, and the first outlet one-way valve 56 from the first tank 12 is opened to allow the oil within the first tank 12 to be discharged back to the auxiliary tank 46 via the auxiliary control fluid return line 50. The oil, having been pressurised by the pump 48 before entering the first tank 12, flows out of the first tank 12 under its own pressure as the auxiliary tank 46 is not pressurised and so a pressure gradient exists between the first tank 12 and the auxiliary tank 46. Both the second inlet one-way valve 58 and the second outlet one-way valve 60 remain closed at this time so the status of the second tank 14 does not change during the oil discharge phase of the first tank 12.

With the first tank 12 depleted of hydrogen gas, the first tank outlet non-return valve 34 closes, under the pressure of hydrogen gas within the common supply line 30, to prevent any return flow of hydrogen gas into the first tank 12. Hydrogen gas within the outlet line 30 and the fuel rail 32 is therefore unable to return to the first tank 12. In summary, the first tank outlet non-return valve 34 is only open when the first tank 12 is being charged with auxiliary fluid.

It will be appreciated by the skilled person that, with the first tank outlet non-return valve 34 closed, the discharge of the auxiliary fluid back into the auxiliary tank leaves the first tank 12 substantially empty, save for some small amount of residual hydrogen gas. However, the residual pressure existing in the first tank 12 when the auxiliary fluid has been fully discharged still exceeds atmospheric pressure.

Figure 4:
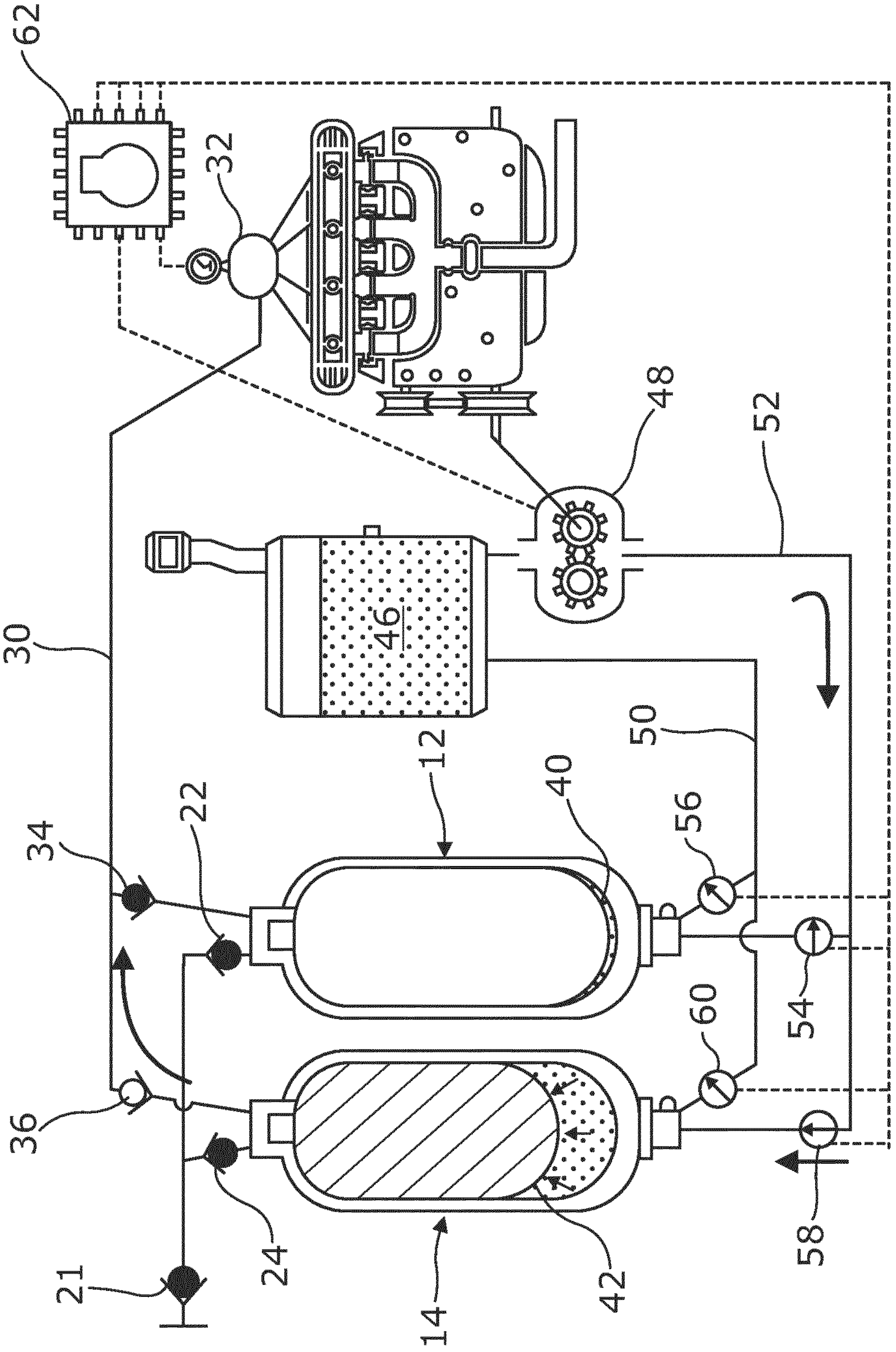

Referring now to FIG. 4, with the first tank 12 depleted of hydrogen gas, subsequent delivery of hydrogen gas to the common rail must be made by the second tank. However, the pressure of the hydrogen gas within the second tank 14 is still at the injection pressure $P_i$, as a result of the initial discharge of hydrogen gas to the common outlet line and fuel rail immediately after the tank array was refilled. In this subsequent method step, hydrogen gas from the second tank 14 is discharged through the common outlet line 30 to the fuel rail 32 as a result of oil being delivered through the second inlet one-way valve 58, in the same way as in FIG. 2 for the first tank 12. As a result of the incoming oil flow from the auxiliary tank 46, the second membrane 42 within the second tank 14 is displaced upwardly (in the illustration shown), reducing the volume of the available space for the hydrogen gas and causing the pressure of the hydrogen gas within the second tank 14 to increase above the pressure of the hydrogen gas in the common outlet line and the fuel rail. This causes the pressure of the hydrogen gas within the second tank 14 to increase and forcing the second tank outlet non return valve 36 to open to discharge hydrogen gas from the second tank 14 into the common outlet line 30. This is described as the “delivery phase” for the second tank 14 as hydrogen gas is delivered into the fuel rail 32 through the common outlet line 30. As discussed above, in this delivery phase of the second tank 14 the first tank 12 is already fully discharged of hydrogen gas. Throughout the delivery phase of the second tank 14 the first inlet one-way valve 54 is maintained in the closed position. Likewise, the first outlet one-way valve 56 remains closed.

In an alternative step to that described above, it is possible for the discharge of oil from the first tank 12 to the auxiliary tank to be implemented at the same time as oil is delivered to the second tank 14 to displace hydrogen gas from the second tank 14 to the fuel rail 32. For this to occur, the ECU 62 sends a control signal to the second inlet one-way valve 58 of the second tank 14 to cause it to open at the same time as the first outlet one-way valve 56 of the first tank 12 is opened to return oil to the auxiliary tank 46. This process will be described in further detail below.

Figure 5:
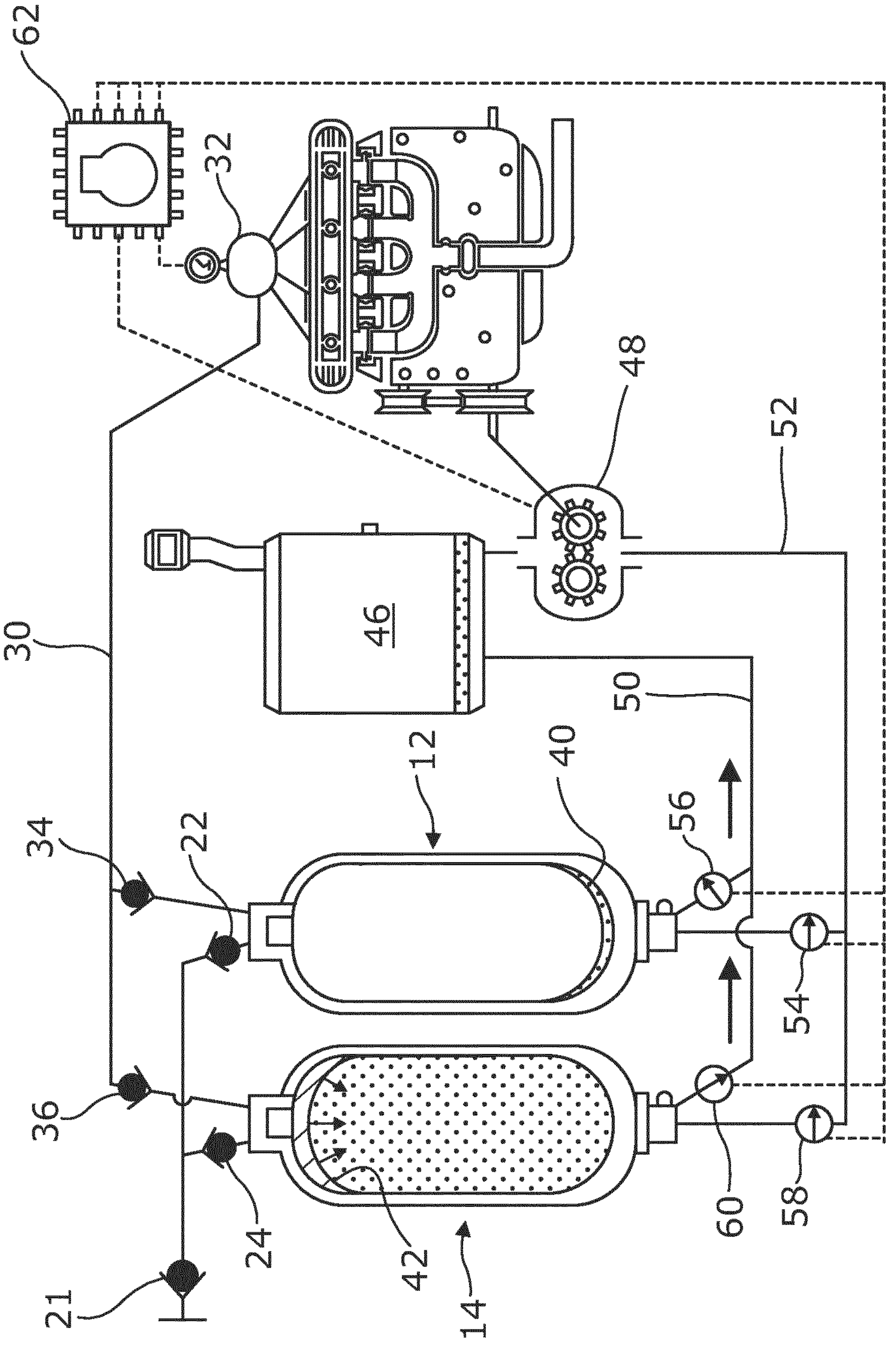

FIG. 5 shows the situation where the hydrogen gas within the second tank 14 is fully depleted, at which point the second tank outlet non-return valve 36 is caused to close (due to the pressure of hydrogen within the supply line 30 to the fuel rail 32). Hydrogen gas within the fuel rail 32 is therefore unable to return to the second tank 14. Also, the second outlet one-way valve 60 is operated to open so as to allow the oil within the second tank 14 to start to discharge back to the auxiliary tank 46, in the same way as described above for the first tank 12 with reference to FIG. 3. Both the first inlet one-way valve 54 and first outlet one-way valve 56 of the first tank 12 remain closed during this phase. As with the first tank 12, once the oil has been fully discharged from the second tank 14 back to the auxiliary tank 46, the second tank 14 is left substantially empty of hydrogen gas, with only a small residual amount of hydrogen gas left inside the tank 14 at a residual pressure exceeding atmospheric pressure.

The system provides an efficient way of discharging pressurised hydrogen gas, at a pressure in excess of atmospheric pressure, to the internal combustion engine, using convenient control of a valve arrangement controlling the supply of auxiliary fluid into the tanks.

Figure 6:
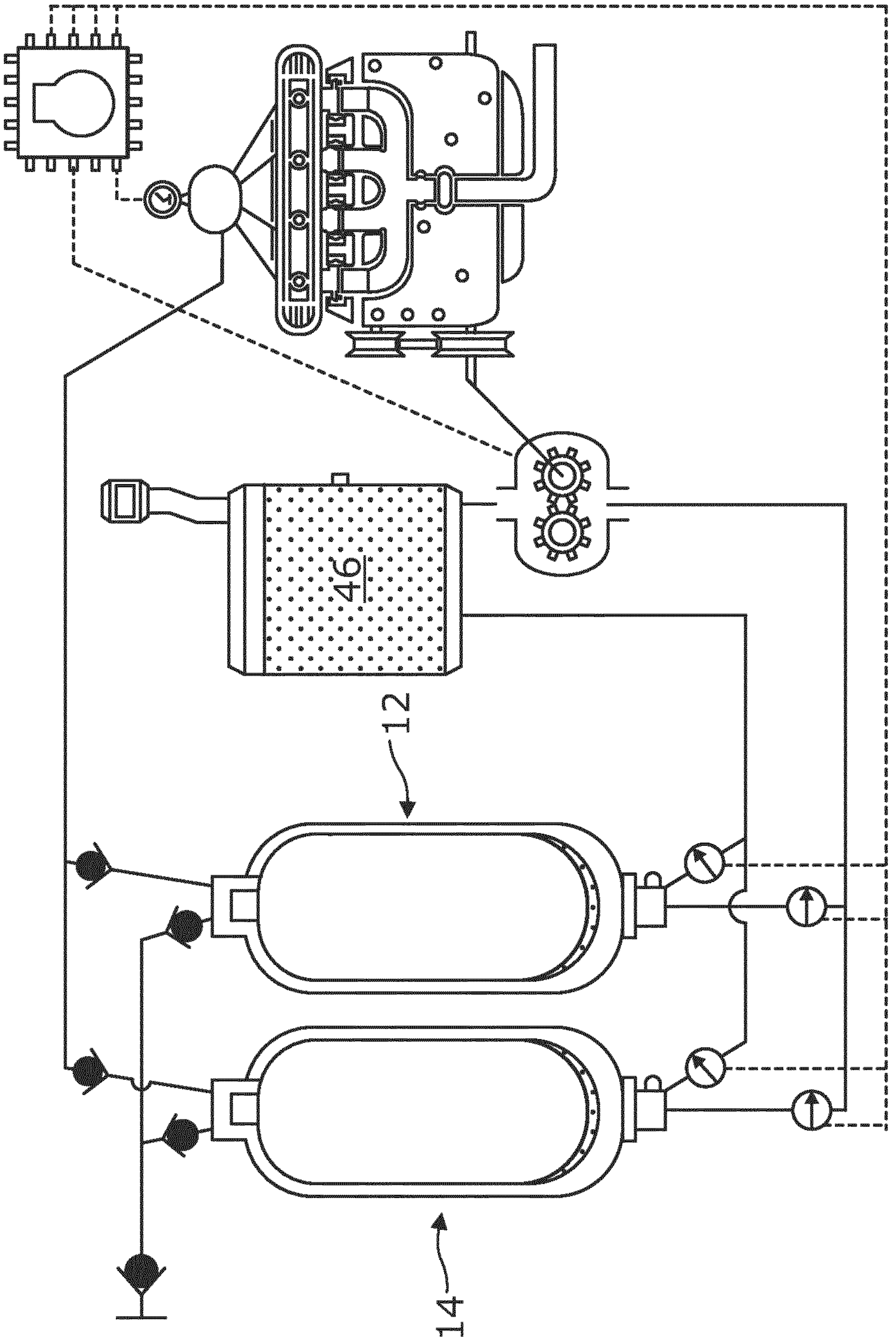

Referring to FIG. 6, once the first tank 12 and the second tank 14 have been fully discharged of hydrogen gas, the system requires re-filling at the filling station (as in FIG. 1). The system may also be re-filled with hydrogen gas when either one or both of the tanks 12, 14 are partially emptied, depending on the convenience of the user.

Figure 7:
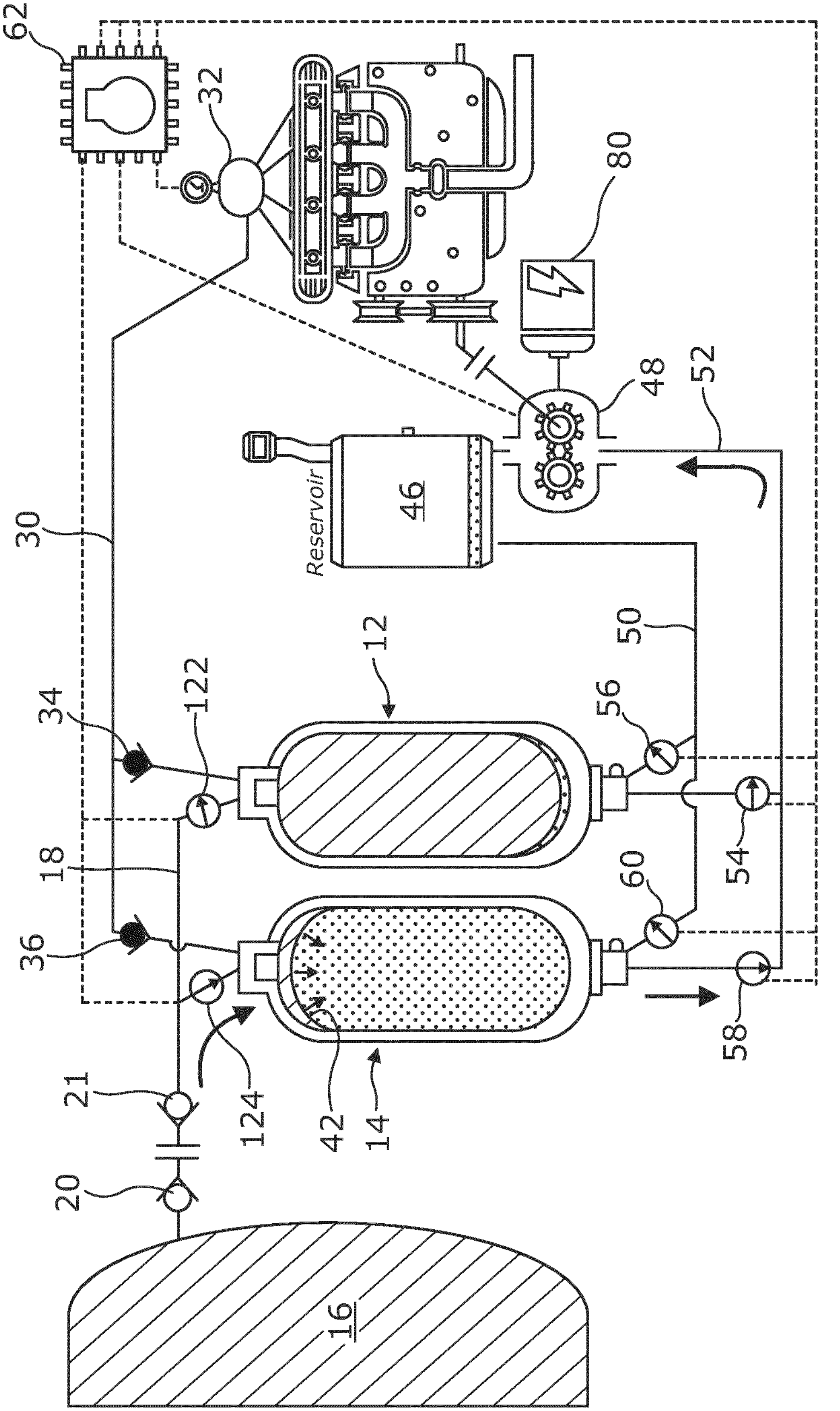
FIGS. 7 and 8 are schematic illustrations of the fuel system in FIGS. 1 to 6 to show a method of operation in accordance with an embodiment of the invention.

FIG. 7 illustrates the system when the first tank 12 is full of hydrogen gas but the second tank 14 has been depleted of hydrogen gas and requires refilling from the supply tank 16 at the service station. The second tank 14 is filled with auxiliary fluid, having been filled with auxiliary fluid so as to discharge the hydrogen gas within the second tank 14 to the supply line 30 and, hence, to the fuel rail 32. The system in FIG. 7 differs from that in FIGS. 1 to 6 in the following respects. Firstly, the first tank inlet non-return valve 22 is replaced with a first tank fuel inlet one-way valve 122 which is controlled by means of the ECU 62, as illustrated by the dashed line electrical connection to the ECU 62. Correspondingly, the second tank inlet non-return valve 24 is replaced with a second tank fuel inlet one-way valve 124 which is controlled by means of the ECU 62, as illustrated by the dashed line electrical connection to the ECU 62. In addition, the pump 48 is connected to an energy store in the form of a battery 80 which is chargeable by running the pump 48 as a motor, as described in further detail below. The battery 80 may be used to provide power to the pump 48, when running in a pump mode, or may be used to supply power to other parts of the engine.

With the supply tank 16 connected to the supply line 18, the pressure of hydrogen gas within the supply tank 16 causes the supply inlet non-return valve 21 of the fuel system to open because the pressure of hydrogen gas in the supply tank 16 exceeds that within the supply line 18. At the same time, the ECU 62 sends a signal to the second tank fuel inlet one-way valve 124 to cause the valve 124 to open, allowing pressurised hydrogen gas from the supply tank 16 to fill the second tank 14. The first tank fuel inlet one-way valve 122 remains closed at this time. A sensor (not shown) may be provided on the fuel system to detect when the system is connected to the tank 36 at the filling station, and a signal is provided to the ECU 62 to indicate the connection status, so that the ECU 62 knows when to initiate opening of the second tank fuel inlet one-way valve 124.

In other embodiments, the ECU 62 may be programmed with an algorithm to determine that the vehicle is filling, based on one or more other vehicle sensors which may be fitted on the vehicle for other purposes.

The first and second tank outlet valves 34, 36 remain closed at this time because, for the first tank 12, the pressure of hydrogen gas in the supply line 30 exceeds that within the first tank 12 (until such time as auxiliary fluid is supplied to the first tank 12) to keep the first tank outlet valve 34 closed, and because the hydrogen gas is still filling the second tank 14 at this time and pressure within the second tank 14 is not high enough to cause the second tank outlet valve 36 to open.

The control valve arrangement is then operated so as to open the second inlet one-way valve 58 (as can be seen in FIG. 7). The second outlet one-way valve 60 remains closed, as do the first inlet one-way valve 54 and the first outlet one-way valve 56. In normal operation, the second inlet one-way valve 58 is used to allow auxiliary fluid to fill the second tank 14 during the filling phase. However, by opening the second inlet one-way valve 58 whilst the second outlet one-way valve 60 remains closed, and with the hydrogen gas filling the second tank 14 from the supply tank 16, auxiliary fluid within the second tank 14 is forced to return through the open valve 58 into the inlet line 52, back through the pump 48, to return to the reservoir 46. In practice, the second inlet one-way valve 58 is opened slightly before the valve 124. During this phase, the pressure generated by hydrogen gas from the filling station is therefore used to generate energy via the reverse flow of auxiliary fluid through the pump 48 which acts as a motor. The energy generated by the motor can be stored in the battery 80 for later use in driving the pump 48 (or for other purposes). This phase of operation may be described as the ‘energy harnessing’ or ‘recuperating’ phase of operation as it enables energy to be harnessed from the filling station, and stored in the battery 80, to reduce the demand on the pump 48 in later cycles. Having passed through the pump 48, auxiliary fluid is returned to the supply tank 46 which remains charged with auxiliary fluid until such time as the inlet valve 54 to the first tank 12 is opened.

Eventually, at the end of the filling phase when the supply tank 16 is disconnected from the supply line 18, the second tank 14 is fully charged with pressurised hydrogen gas once more and the supply tank 46 is filled with auxiliary fluid.

Figure 8:
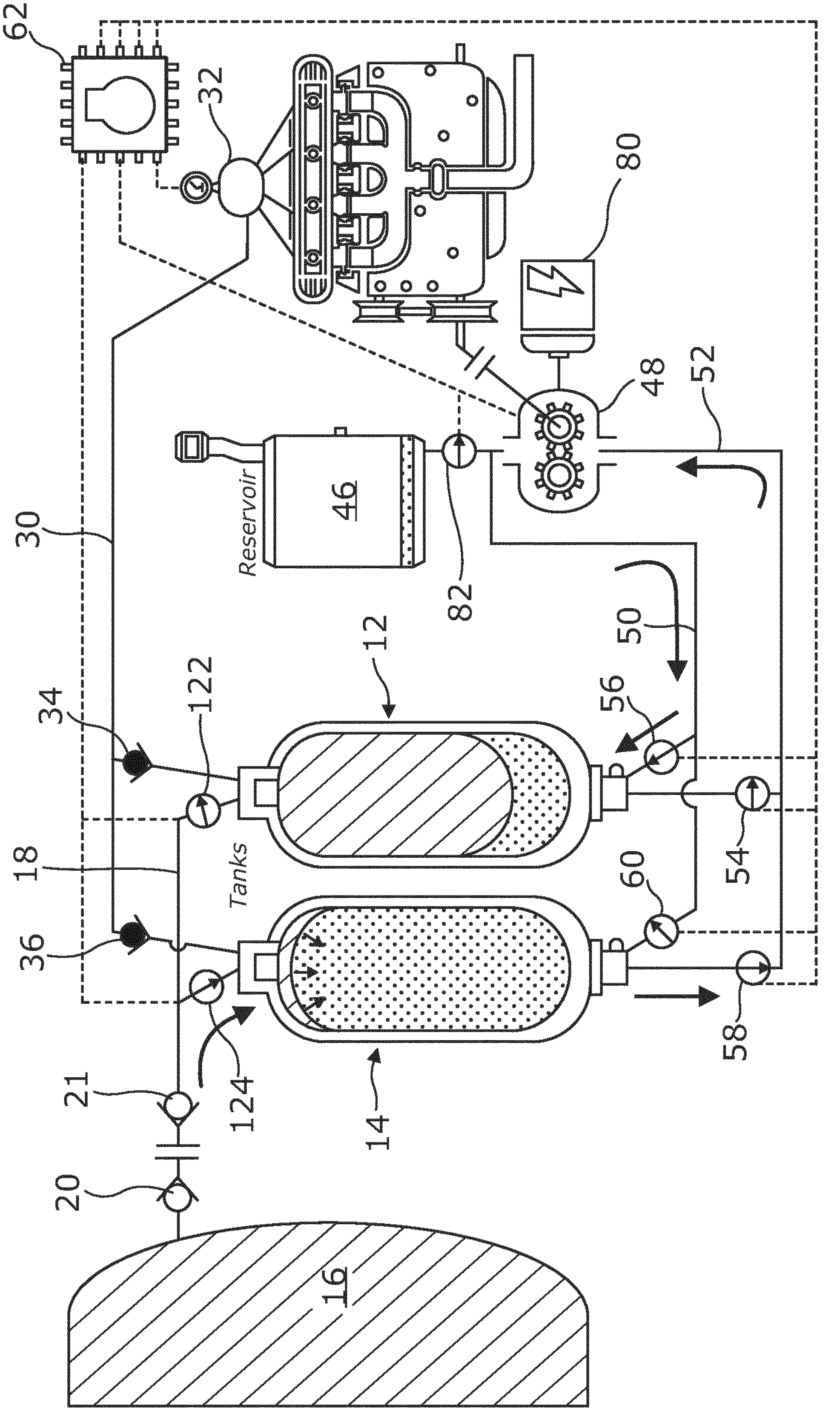

FIG. 8 shows a modification to the system shown in FIGS. 1 to 7 in which an additional two-way valve 82 is provided, operable under the control of the ECU 62 (as indicated by the dashed control line) to control the communication between the supply tank 46 and the auxiliary fluid inlet and return lines 52, 50. The additional two-way valve 82 has two operating positions. In a first (closed) position, the additional valve 82 closes the inlet port on the supply tank 46 and allows the auxiliary control fluid supply line 52 to communicate directly with the auxiliary control fluid return line 50, without the need to pass through the supply tank 46. In the second (open) position, the additional two-way valve 82 opens the inlet port on the supply tank 46 to allow the auxiliary fluid return line 52 and the auxiliary fluid supply line 50 to communicate with the supply tank 46.

The method of operation of the system in FIG. 8 is similar to that shown in FIG. 7, in that energy derived from the filling station is harnessed by reversing the flow through the pump 48 to act like a motor. However, in this case the returning flow of auxiliary fluid which is displaced from the second tank 14 is used to directly fill the first tank 12, to displace hydrogen gas from the first tank 12, whilst the second tank 14 is filled with hydrogen gas. The method of operation of the system in FIG. 8 will now be described in more detail.

As for FIG. 7, the supply tank 16 is connected to the supply line 18 and the system inlet 21 is caused to open due to pressure in the supply tank 16 exceeding that within the supply line 18. In addition, the ECU 62 controls the second tank fuel inlet one-way valve 124 to open, so as to enable hydrogen gas to fill the second tank 14. In practice, the second inlet one-way valve 58 is opened slightly before the valve 124. The first tank fuel inlet one-way valve 122 remains closed at this time. A sensor (not shown) may be provided on the fuel system to detect when the system is connected to the filling station and the tank 16, and a signal is provided to the ECU 62, so that the ECU 62 knows when to initiate opening of the second tank fuel inlet one-way valve 124.

The first and second tank outlet valves 34, 36 remain closed at this time because, for the first tank 12, the pressure of hydrogen gas in the supply line 30 exceeds that within the first tank 12 (until such time as auxiliary fluid is supplied to the first tank 12) to keep the first tank outlet valve 34 closed, and because the hydrogen gas is still filling the second tank 14 at this time and pressure within the second tank 14 is not high enough to cause the second tank outlet valve 36 to open.

In addition to opening the second inlet one-way valve 58 to allow auxiliary fluid to return to the supply tank 46 via the pump 48, the ECU 62 controls the first outlet one-way valve 56 so that it is also opened at the same time (as seen in FIG. 8). In addition, the additional valve 82 is controlled by the ECU 62 to move to the closed position in which the inlet port to the supply tank 46 is closed. As a result, the supply of pressurised hydrogen gas to the second tank 14 displaces auxiliary fluid from the second tank 14 back through the inlet line 52 to the pump 48. With the reverse flow of fluid through the pump 48, the pump acts as a motor and generates energy which can be stored in the battery 80. With the additional valve 82 closing the supply tank 46, fuel in the auxiliary control fluid inlet line 52 is thus able to flow through the additional valve 82 directly into the auxiliary control fluid return line 50 (and into the first tank 12), rather than returning to the supply tank 46. In other words, the supply tank 46 is bypassed by the return flow through the lines 50, 52 because the additional valve 82 is closed. In this system, filling of the second tank 14 with hydrogen gas occurs simultaneously with the filling of the first tank 12 to discharge hydrogen gas from the first tank 12 into the supply line 30.

In practice, pressure sensors (not shown) may be provided for the first and second tanks, 12, 14, for the fuel-rail 32 and also in the auxiliary control fluid feed and return lines 52, 50. The pressure sensors would be used to optimise any opening/closing and any phasing between valve operation for any cylinder to reduce the risk of cavitation damage to the seats. For example, it is beneficial if the inlet one-way valves for control fluid (valves 54, 58) are opened before the inlet valves 122, 124 from the filling station, as this would reduce the risk of cavitation.

In FIG. 8, as for FIG. 7, the energy that is harnessed from the hydrogen gas filling the second tank 14 benefits the overall system efficiency because, ultimately, the demand on the pump 48 can be reduced through the storage of energy in the battery 80 which is recovered from pressurised hydrogen supply from the filling station.

It will be appreciated that various other embodiments of the invention are also envisaged without departing from the scope of the appended claims. For example, the system has been described with reference to a supply of gaseous fuel to an internal combustion energy of a vehicle, but it will be appreciated that it is equally applicable to other applications in which there is a need to supply gaseous fuel for power generation. When employed to supply gaseous fuel to an engine, the engine may, but need not, form a part of a vehicle. Other vehicle applications are envisaged, including fuel cell applications where the fuel system is used to supply hydrogen gaseous fuel to a cell as opposed to a rail for hydrogen gas storage. The invention is also applicable to other types of gas, and not just hydrogen gas. For example, the fuel system may provide a supply of compressed natural gas to a power plant, for example an engine.

The invention claimed is:

1. A fuel system for supplying gaseous fuel to a power plant, the fuel system comprising:

a tank array comprising at least a first tank and a second tank configured to receive pressurised gaseous fuel for supply to the power plant, in use, from a filling station when the tank array is connected to the filling station;

a source of auxiliary control fluid for supplying auxiliary control fluid to the tank array when the fuel system is disconnected from the filling station;

a pump for pressurising auxiliary control fluid supplied to the tank array when auxiliary control fluid flows through the pump in a forward direction;

an energy store; and a valve arrangement which is operable to control the supply of auxiliary control fluid to the tank array so as to control a discharge of the gaseous fuel from the tank array, the valve arrangement being further operable to enable a reverse direction of flow of auxiliary control fluid from the tank array through the pump, when the fuel system is connected to the filling station, in use, to generate energy from the pump to store in the energy store;

wherein the valve arrangement includes, for each tank of the array, an inlet one-way valve which is operable to control the supply of auxiliary control fluid to an associated tank in one direction at a time and an outlet one-way valve which is operable to control the supply of auxiliary control fluid from the associated tank to the source of auxiliary control fluid in one direction at a time;

wherein the valve arrangement further includes an additional valve which is operable to close the source of auxiliary control fluid to allow auxiliary fluid within one of the first and second tanks to be returned in the reverse direction through the pump to the other of the first and second tanks bypassing the source of auxiliary control fluid.

2. The fuel system as claimed in claim 1, wherein the valve arrangement includes, for each tank of the array, a fuel inlet one-way valve which is operable to control the supply of gaseous fuel to the tank array.

3. The fuel system as claimed in claim 1, wherein the valve arrangement is operable by means of an electronic control unit.

4. The fuel system as claimed in claim 1, wherein the power plant is an internal combustion engine of a vehicle.

5. The fuel system as claimed in claim 1, wherein the gaseous fuel is hydrogen.

6. A method for supplying gaseous fuel from a fuel system to a power plant, the method comprising:

receiving pressurised gaseous fuel from a filling station in a tank array, when the fuel system is connected with the filling station;

pressurising auxiliary control fluid from a source of auxiliary control fluid by a pump when the auxiliary control fluid flows through the pump in a forward direction;

supplying pressurised auxiliary control fluid to the tank array so as to discharge gaseous fuel from the tank array to the power plant, when the fuel system is disconnected from the filling station; and enabling, under the control of a valve arrangement, a reverse direction of flow of auxiliary control fluid from the tank array through the pump, when the fuel system is connected to the filling station, so as to generate energy from the pump for storage within an energy store;

wherein the fuel system includes an inlet one-way valve configured to control the flow of control fluid to an associated tank of the tank array in one direction at a time, and an associated inlet valve configured to control the supply of gaseous fuel from the filling station to the associated tank, the method comprising operating the inlet one-way valve for control fluid prior to operating the inlet valves for gaseous fuel from the filling station when it is required to return control fluid in the reverse direction through the pump.

* * * * *